Figure 1:
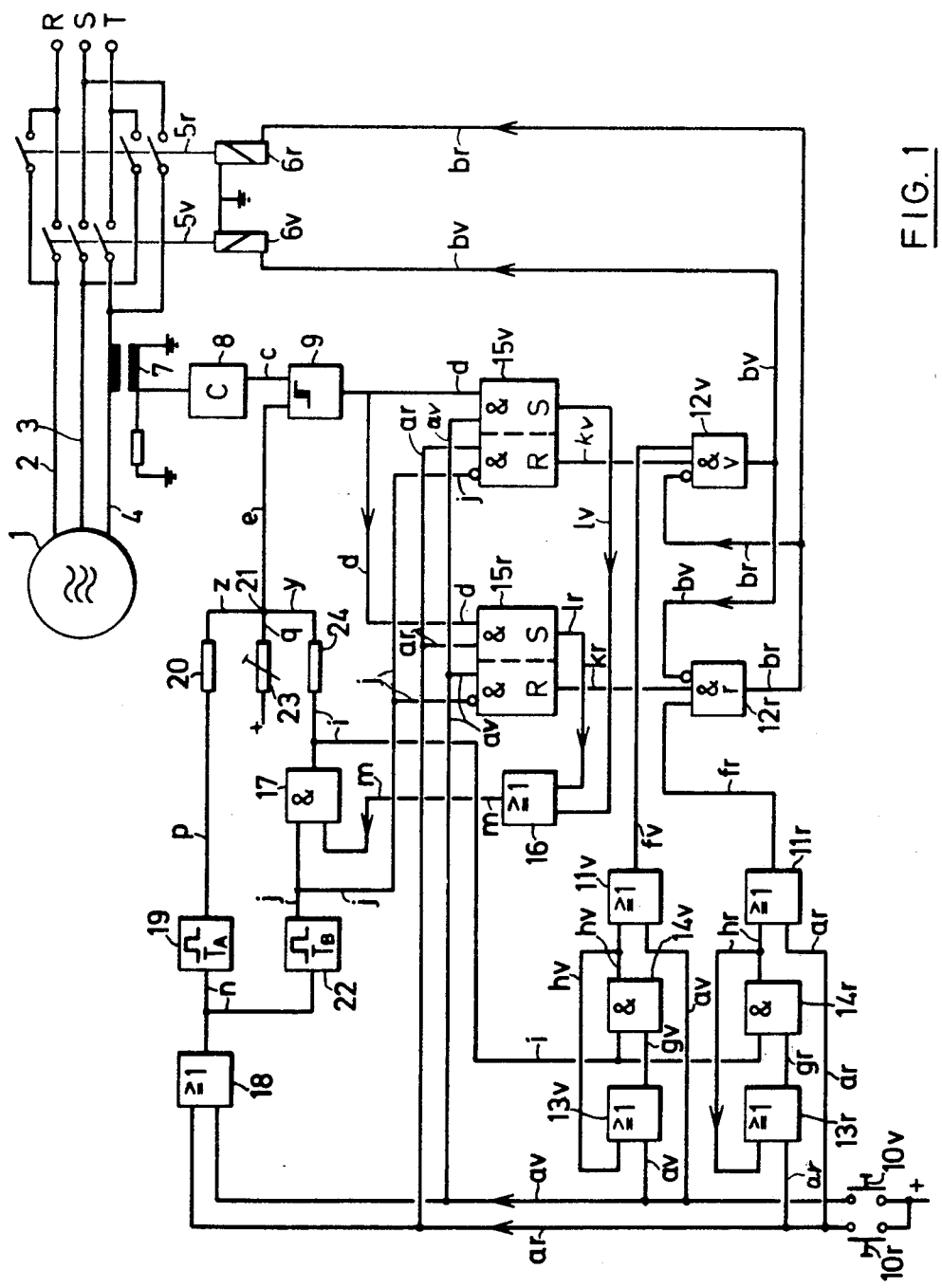

United States Patent [19]
Konig

[11] 3,974,422
[45] Aug. 10, 1976

[54] CIRCUIT ARRANGEMENT FOR OVERLOAD PROTECTION OF A DRIVE MOTOR

[75] Inventor: Ferdinand Konig, Seuzach, Switzerland

[73] Assignee: Sulzer Brothers Limited, Winterthur, Switzerland

[22] Filed: Feb. 6, 1975

[21] Appl. No.: 547,444

[30] Foreign Application Priority Data
Feb. 14, 1974 Switzerland.......................... 2107/74

[52] U.S. Cl. ................................ 317/13 A; 317/22; 318/469
[51] Int. Cl.² ......................................... H02H 7/08
[58] Field of Search ............. 317/13 R, 13 A, 13 B, 317/22; 318/469, 281, 282, 283, 284, 285, 476

[56] References Cited
UNITED STATES PATENTS

| | | | |
|---|---|---|---|
| 3,075,134 | 1/1963 | Manney | 318/476 |
| 3,513,374 | 5/1970 | Koment | 318/476 X |
| 3,611,099 | 10/1971 | Kuroyama | 318/476 |
| 3,875,487 | 4/1975 | White | 317/13 A X |
| 3,891,909 | 6/1975 | Newson | 318/469 |

Primary Examiner—J D Miller
Assistant Examiner—Patrick R. Salce
Attorney, Agent, or Firm—Kenyon & Kenyon Reilly Carr & Chapin

[57] ABSTRACT

The circuit arrangement is provided with a pickoff in the inhibitor cancelling means which activates the cancelling means only after the lapse of a predetermined time interval during an "on" start signal for a reversal of the motor. Once activated, the cancelling means deactivates the inhibitors which are used to prevent restarts of the motor in the same direction as before a switch-off caused by a motor-load-responsive measuring means.

The pickoff used may be a delay element which lengthens the first brief "on" signal after a stop for the predetermined minimum "on" time. Alternatively, the pickoff may be in the form of an integrator in which "on" signals shorter than the predetermined "on" time are summated. In this case, after summation of the discrete "on" times to the predetermined minimum "on" time, the integrator emits a signal to activate the cancelling means.

4 Claims, 2 Drawing Figures

CIRCUIT ARRANGEMENT FOR OVERLOAD PROTECTION OF A DRIVE MOTOR

This invention relates to a circuit arrangement for overload protection of a drive motor for control elements.

As is known, various types of control elements, such as control valves, utilize a circuit arrangement employing a drive motor and switching means to drive the control element in opposite directions. For example, the motor may be caused to run in one direction in response to first switching means and in the other direction in response to second switching means. Generally, the motor is switch-off by a motor-load-responsive measuring means which acts on the switching means associated with whichever direction of rotation happens to be in use. Further, inhibitors have been used which operate, in the event of a switch-off produced by the measuring means, to prevent a restart in the immediately previous direction of rotation. The inhibiting effect of the inhibitors has usually been cancelled only by cancelling means triggered by a start signal for the opposite direction of motor rotation. Also, the motor loading may be permitted to rise to a higher value for a predetermined time during the starting phase without the measuring means causing a switch-off.

One such circuit arrangement is disclosed by U.S. Pat. No. 3,612,972. The purpose of the arrangement described is to ensure that mechanical control elements which strike a fixed resistance, such as a stop, in an end position, cannot have their mechanical parts damaged or destroyed when, after a stoppage produced by an "off" signal from a load-measuring means, the motor is restarted to run in the previous direction of rotation. However, the inhibitors which the known system employs to solve this problem can be cancelled by any "on" signal, however brief, for the opposite direction of rotation. Consequently, there is a risk of a brief signal for the opposite direction being sufficient to cancel the inhibiting means but insufficient to produce adequate movement in the opposite direction. A subsequent signal for entry into the end position thus presses the control element even more firmly against the stop or abutment since the motor loading during the starting phase is allowed to be higher than its normal value without resulting in a stoppage. In the event of repetitions of this phenomenon, the final control element is pressed more and more firmly into the end position until, finally, a prolonged "on" signal for the opposite direction of rotation fails to start the control element. This occurs since the permissible starting overload — a proportion of which may be provided for a relatively long time in certain circumstances for a so-called "difficult" start — ceases to be sufficient to free the jammed-together mechanical parts.

The brief "triggering" of the opposite direction and the resulting cancellation of the inhibitors therefore results in a failure to control the closing force of a control element which has moved into engagement with an abutment in cases where there is a subsequent prolonged "on" signal for movement into the end position. As a result, either the control element or the drive is damaged or destroyed, or, the control element fails to operate properly because the force available to start the element in the opposite direction is inadequate.

Accordingly, it is an object of the invention to prevent cancellation of the inhibitors in an overload protection circuit arrangement for a restart in the same direction by very short signals in the opposite direction.

It is another object of the invention to ensure that in the case of a renewed approach to the end position — after intermediate selection of the opposite direction — the uncontrollable starting phase of the motor of an overload protection circuit arrangement has elapsed before the motor loading reaches the value triggering a normal stoppage.

Briefly, the invention is directed to a circuit arrangement for overload protection of a reversible drive motor which includes a first switching means for activating the motor to run in a first direction, a second switching means for activating the motor to run in a second direction opposite the first direction, a motor-load-responsive measuring means selectively connected to one or the other of the two switching means to switch-off the motor in response to a predetermined load on the motor, and inhibitors for preventing a restart of the motor in the same direction as before a switch-off. These inhibitors are responsive to the measuring means switching-off the motor. The circuit arrangement also includes cancelling means for deactivating the inhibitors in response to a start signal for running the motor in a direction reverse to the direction occurring before a switch-off caused by the measuring means. In accordance with the invention, the cancelling means includes a pickoff for activating the cancelling means only in response to the lapse of a predetermined time interval during a start signal for reversing the motor.

Because of the minimum "on" signal time feature, the motor runs in the opposite direction for an amount which, at a renewed end-portion approach, is such that the uncontrolled starting phase terminates before the loading for a normal switch-off has been reached.

Advantageously, the pickoff is a delay element through whose agency the first brief "on" signal of whatever duration, after a previous switch-off produced by the measuring means, is lengthened into the predetermined minimum "on" time.

In another embodiment, in order to ensure that the lengthening of the "on" time cannot interfere under any circumstances in the switching logic of adjacent or dependent systems, the pickoff is an integrator in which, after a previous switch-off produced by the measuring means, "on" signals shorter than the predetermined minimum "on" time are summated; after summation of the discrete "on" times to the predetermined minimum "on" time, an output signal from the integrator releases the cancelling means for the inhibitors.

Figure 2:
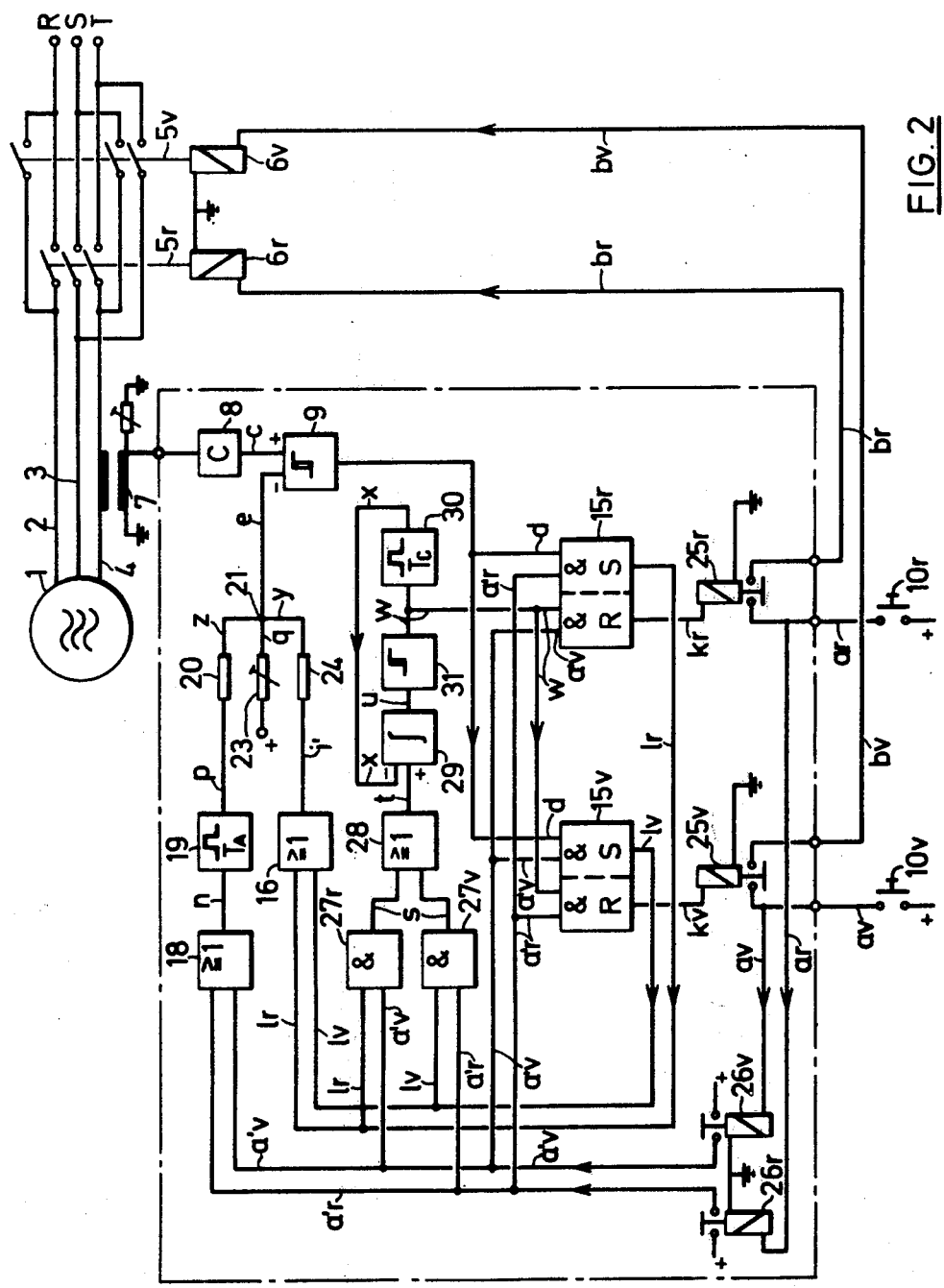

These and other objects and advantages of the invention will become apparent from the following detailed description and appended claims taken in conjunction with the accompanying drawings in which:

FIG. 1 diagrammatically illustrates a circuit diagram of a circuit arrangement according to the invention in which the limiting-value pickoff is in the form of a delay or time element which lengthens the "on" time; and FIG. 2 illustrates a circuit arrangement according to the invention using an integrator to summate relatively short "on" signals.

The symbols used for the discrete function elements in FIGS. 1 and 2 correspond to the 1972 IEC (International Electrotechnical Commission) recommendations for binary elements. The circuit arrangements are shown in extenso to facilitate comprehension; of course, they can be considerably simplified by a consequential application of the substitution rules of circuit algebra.

Referring to FIG. 1, the circuit arrangement includes a motor 1 connected via lines 2–4 to the three phases R, S and T of a three-phase supply and serves to drive a final control element (not shown), such as a variable or on/off valve. The control element runs in one directin $v$ of rotation corresponding e.g. to an opening of the valve in response to a switching means $5v$ and in the other direction $r$ of rotation in response to a switching means $5r$. The switching means $5v$, $5r$ are shown as mechanical switches which are operated by magnetic windings $6v$, $6r$.

The elements and signals shown paired for the opening and closing movements of the final control elements have the same basic references with the addition of the letter "$v$" to denote elements corresponding to the opening direction and with the addition of the letter "$r$" for the elements corresponding to the closing direction. Unless otherwise necessary, the circuit arrangement is described hereinafter with reference to only one direction of rotation of the motor 1, the system operating similarly in the other direction of rotation.

For the sake of simplicity, the motor-load-responsive measurement means to determine motor torque is diagrammatically represented by a current transformer 7 whose primary winding is disposed in the line 4 associated with the phase T. The observed-value signal of the transformer 7 is converted in a computer 8 into an actual-value signal $c$ corresponding to motor loading and is supplied to a trigger 9. The trigger 9, in turn, outputs a signal $d$ when the absolute value of signal $c$ exceeds a second input signal $e$ representing the instantaneous maximum permissible loading of motor 1.

As shown, the motor 1 is switched on by two press buttons $10v$ and $10r$ which each trigger a respective "on" signal $av$ and $ar$. Upon triggering, the "on" signal $av$ is emitted to five points in the circuit arrangement as follows.

First, the "on" signal $av$ is passed via an OR-gate $11v$ as a signal $fv$ to an AND-gate $12v$ where the signal forms one of three gating conditions for the appearance of an output signal $bv$ which energizes the winding $6v$ of switch $5v$ and thus makes the motor 1 run in the valve-opening direction. The output signal $bv$ also passes to an AND-gate $12r$ as a gating condition as explained below.

Secondly, the signal $av$ goes to another OR-gate $13v$ and passes as a signal $gv$ to another AND-gate $14v$ whose output signal $hv$ passes to the first OR-gate $11v$ as a second input signal and is also returned as a further input signal to the second OR-gate $13v$.

In addition to the signal $gv$, the second gating condition at the input of AND-gate $14v$ is another signal $i$, the generation and function of which will be described hereinafter.

The gates $13v$, $14v$ function as a self-holding (stick) means which — after a switch-off of the motor 1 due to entry into an end position in the closing direction — operates to hold the signal $hv$, even in the presence of a brief signal $av$, for a predetermined "on" time whose termination is triggered by disappearance of the signal $i$ from the input of the AND-gate $14v$.

Third, the "on" signal $av$ is transmitted as one of two switching conditions in an "AND" relationship, to the resetting input of a store $15r$ having a defined "on" position R. The store $15r$ is embodied by a known kind of bistable arrangement which flip-flops into the "on" position not only in the presence of the gating conditions at the resetting input but also when the supply voltage is switched on. The output of the store $15r$ has the value $kr = 1$. In addition to the "on" position R, the store $15r$ has a second position S (setting) into which the store $15r$ flip-flops in the presence of the "AND"-related gating or switching conditions $ar$ and $d$. Through the agency of the position S, the store $15r$ acts in known manner as an inhibitor to prevent a further "on" of the direction of rotation previously stopped by the measuring facility 7, 8, 9. This direction corresponds, in the present case, to the closing direction. Of course, the inhibitors $15r$, $15v$ can be embodied as circuit arrangements which do not lose their information when the supply voltage ceases — i.e., which remain in the position they were in prior to cessation of the supply voltage after the supply voltage is switched on again.

The signal $av$ also forms, in known manner, one of the two signals required at the resetting input of store $15r$ to cancel the inhibitors for the "closing" direction of rotation. Upon the appearance of the latter signal, and if the inversion of a signal $j$ is also present, i.e., if the signal $j$ is absent, the store $15r$ flip-flops back into the defined "on" position R.

Fourth, the signal $av$ is transmitted to the input of the side S of a similar store $15v$, where together with the "off" signal $d$. the signal represents the two conditions needed to be present simultaneously for the store $15v$ to flip-flop into a position S, with the result that the signal $kv$ associated with the "on" position R of the store $15v$ disappears at the output and a signal $lv$ appears at the output of the side S and goes to another OR-gate 16.

The output signal $m$ of the gate 16, whose other input receives the signal $lr$, similar to the signal $lv$, for the other direction of rotation, is transmitted to an AND-gate 17.

Fifth, the "on" signal $av$ is transmitted to an OR-gate 18 whose other input is associated with the "on" signal $ar$ of the other direction of rotation. The OR-gate 18 emits an output signal $n$ which is transmitted through a first delay element 19 as an output signal $p$ for a time determined by the delay element time constant $T_A$, and through a resistance 20 as a signal $z$ to a summation point 21.

The output signal $n$ of the OR-gate 18 is also transmitted to the input of a second delay element 22 which operates similarly to the first delay element 19 but has a different and longer time constant $T_B$ than the delay element 19. The second delay element 22 outputs the signal $j$ which passes to the AND-gate 17, whose other input receives the signal $m$ coming from the OR-gate 16. This latter signal $m$ indicates that e.g. the store $15r$ has been placed in a position or state S such that a restart in the direction of rotation associated therewith — after running into the "closing" end position and a resulting stoppage by the measuring facility 7, 8, 9 — has been inhibited. Thus, the gate 18 and delay element 22 form a cancelling means for deactivating the inhibitors $15r$, $15v$ in response to a start — i.e., "on" signal for running the motor 1 in a direction reverse to the direction occurring before a switch-off by the trigger 9. Further, the delay element 22 acts as a pickoff for activating the cancelling means only in response to the laspe of the time constant $T_B$ during the start signal $ar$ for running the motor 1 in a reverse direction.

The output signal $j$ is also supplied, after inversion, to the input of the "on" position R, e.g. of the store 15r where its non-presence plus the presence of an "on" signal $av$ for the direction of rotation not associated therewith forms the second switching condition for resetting the store 15r in the stable state R in which a signal $kr$, forming one of the gating conditions at AND-gate 12r, is formed.

The "on" signal $fr$ and the inverted output signal $bv$ of the AND-gate 12v are present, as a further gating condition, at the inputs of AND-gate 12r. In known manner, the inversion of the signal $bv$ at the AND-gate 12r prevents a simultaneous energization of the two windings 6v and 6r — i.e., the inverted signal $bv$ prevents an "on" signal being given simultaneously for both directions of rotation to the switches 5v, 5r, for otherwise there might be short circuits.

When the two signals $j$ and $m$ are present at AND-gate 17, the gate 17 outputs the signal $i$ which is then transmitted as noted above to the AND-gates 14v and 14r as a gating condition and is also supplied via a resistance 24 to the point 21 as a signal $y$.

Another signal $q$ is supplied by an auxiliary power supply (not shown) via a fixed resistance 23 to the point 21. The sum of all three signals $z$, $q$ and $y$, which all have a respective fixed value determined by the size of the resistances 20, 23, 24 forms the signal $e$ representing the set value for a permissible motor loading. The signal $q$ represents the normal-running set value for the switch-off torque of the motor 1; signal $z$ is about five times the value of signal $q$ and represents the starting loading permissible for the short time T ($\approx 0.5$ second) during starting of the motor; and for a so-called "difficult" start signal $y$ permits an increased loading, amounting to approximately 50% more than the switch-off torque, for the longer period $T_B$ ($\approx 2$ or 3 seconds).

The signals $z$, $q$, $y$ are analog signals, whereas all the switching elements disposed in the signal flow direction before the resistances 20, 23, 24 and, in this example, all the switching elements disposed after the set and actual value comparison $e/c$ are digital devices.

The lengthening of a first "on" signal $av$ for the opposite direction after a previous "off" by the measuring facility 7, 8, 9 is determined by the time constant $T_B$ of the delay element 22. That is, when an "on" signal $av$ appears, a signal $n$ and, therefore, a signal $j$ appear. However, the inversion — i.e., the absence — of the signal $j$ is a condition for resetting of the store 15r which when in the S state acts as an inhibitor preventing a restart in the "closing" direction. The time $T_B$ must elapse, despite the presence of any first "on" signal $av$, however brief the latter may be, before the signal $j$ disappears.

Also, the presence of the signal $j$ — plus the presence of the signal $m$ for a store which has been placed in the S state — is a condition for the delivery of the signal $i$ which in turn must be present, together with e.g. the signal $gv$ at the gate 14v, for the delivery of the signal $hv$ which triggers a signal $fv$. However, a signal $fv$ — plus an output signal $kv$ from store 15v — is one of the gating conditions at the AND-gate 12v for triggering the signal $bv$ for energizing the winding 6v. Consequently, in the case of brief signal $av$, the stick facility 13v, 14v is released only upon the termination of the predetermined minimum "on" time $T_B$ by a disappearance of the signal $i$ or $j$, and, in the absence of "on" signal $av$, the motor 1 is stopped in the "opening" direction without running into the end position — i.e., without a signal $d$.

Referring to FIG. 2, wherein like elements and signals have the same basic references as in FIG. 1 and elements and signals having functions similar to those in FIG. 1 have the same references with the addition of an apostrophe, the "on" signal $av$ initiated e.g. by means of press button 10v serves directly as the signal $bv$ for energizing the winding 6v. The line for the signal $av$ therefore has an output relay 25v which is controlled by the circuit arrangement and which is in the energized state for normal operation of the motor 1 and produces the direct transfer from the signal $av$ to the signal $bv$. Relay 25v drops — and thus cuts off the power to motor 1 — only when the output signal $kv$ associated with the stable state R of store 15v disappears — i.e., when the motor 1 has been stopped by a signal $d$ triggered by the measuring facility 7–9.

Also, a signal $av$ triggered by button 10v energizes an input relay 26v which then transmits "on" signals $a'v$ which, as in the first example, go to the inputs of the S and R state of the store 15v and 15r, respectively.

As previously described with reference to FIG. 1, the "on" signals $a'v$ at these inputs to the stores 15v and 15r form one of two "AND"-linked switching conditions for setting or resetting the store 15v or 15r.

In addition to the starting phase procedure just described by means of the signals $a'v$ through the agency of the elements 18–21 and of the signals $n$-$e$, the signals $a'v$ are supplied to another AND-gate 27r to whose second input the output signal $lr$ of the store 15r in the S state is applied. The signal $lr$ — which indicates the setting of the store 15r and therefore a switch-off of the associated "closing" direction by the measuring facility 7-9 and an inhibition of such direction — acts as shown in FIG. 2 by way of OR-gate 16 to trigger a signal $i'$ which increases the set value $e$, even after termination of the normal starting phase, for a "difficult" start for as long as the store 15r is set, i.e., for as long as the motor has not started to run in the opposite "opening" direction. The signal $i'$ therefore disappears in this case not after a predetermined time $T_B$ but only upon the resetting of a previously set store 15v or 15r.

If, for instance, the two stepping-on conditions $lr$ and $a'v$ are present at the AND-gate 27r, the gate 27r outputs a signal $s$ which is applied via an OR-gate 28 as a signal $t$ to one input of an integrator 29 which totalizes all the brief "on" signals $a'v$ arising e.g. in the event of the store 15r being inhibited for the opposite direction, until they amount to a predetermined minimum total "on" time. The integrator 29 has to output an output signal $u$ of a predetermined value to cause a trigger 31 to output a signal $w$ which appears at the input of the previously set store 15r as the second switching condition for resetting to the state R and which is also transmitted via a delay element 30 having a time constant $T_C$ to a second input of integrator 29 to cancel the previously integrated "on" signals $a'v$ after the appearance of an output signal $w$ and zero resets the integrator 29 in readiness for further integration of such signals. Since integrator resetting takes some time, the signal $w$, which disappears very rapidly after operation of the trigger 31, is artificially lengthened by the delay member 30 and appears as a resetting signal $x$ which completely clears the integrator 29.

Since the appearance of a signal $w$ is an essential precondition for a resetting — in the case described — of the store 15r and therefore for a cancellation of the inhibitors, the integrator 29 helps to ensure a predetermined minimum total "on" time for the opposite direction before inhibition of the store 15r for a restart towards the end position is cancelled.

Since, accurately speaking, the time required to overcome the starting inertia of a motor 1 should not be included in the integrator summation simulating one direction of the rotation of motor 1, appropriate corrections can be provided to neglect a predetermined time, e.g. of 10 msec of each time signal acting on integrator 29 in the integration. In the simplest case, such a correction can take the form e.g. of a delayed "on" for OR-gate 28 so that a preset fixed amount of each time signal transmitted to the integrator 29 is negated from summation. Another advantage of this form of correction is that the integrator is not operated by stray and usually very brief intereference signals.

What is claimed is:

1. A circuit arrangement for overload protection of a reversible drive motor comprising
    a first switching means for activating the motor to run in a first direction;
    a second switching means for activating the motor to run in a second direction opposite said first direction;
    a motor-load-responsive measuring means selectively connected to said first and second switching means to switch-off the motor in response to a predetermined load on the motor;
    inhibitors for preventing a restart of the motor in the same direction as before a switch-off, said inhibitors being responsive to said measuring means switching-off the motor; and
    cancelling means for deactivating said inhibitors in response to a start signal for running the motor in a direction reverse to the direction occurring before a switch-off caused by said measuring means, said cancelling means including a pickoff for activating said cancelling means only in response to the lapse of a predetermined time interval for a start signal for running the motor in a direction reverse to the direction occurring befoe a switch-off caused by said measuring means.

2. A circuit arrangement as set forth in claim 1 wherein said pickoff is a delay element for lengthening a first brief start signal after a switch-off caused by said measuring means into said time interval.

3. A circuit arrangement as set forth in claim 1 wherein said pickoff is an integrator for summating start signals generated after a switch-off and for shorter times than said time interval before activating said cancelling means in response to a summation of the discrete "on" times to said predetermined time interval.

4. A circuit arrangement as set forth in claim 3 which further includes a means for negating from summation a preset fixed amount of each time signal transmitted to said integrator.

* * * * *